(12) United States Patent
Vervoort et al.

(10) Patent No.: US 7,287,308 B1
(45) Date of Patent: Oct. 30, 2007

(54) SWARF CUTTER

(75) Inventors: Hubertus P. P. J. Vervoort, Venlo (NL); Johannus S. T. M. Gubbels, Sambeek (NL)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/412,629

(22) Filed: Apr. 27, 2006

(51) Int. Cl.
 *B23B 27/00* (2006.01)
(52) U.S. Cl. .................. 29/27 R; 29/27 C; 82/52; 82/901; 409/137; 241/236; 241/294
(58) Field of Classification Search ............... 29/27 R, 29/27 C, DIG. 52; 82/52, 53, 54, 55, 56, 82/57, 901; 409/137, 139; 241/166, 167, 241/235, 236, 343, 285.1, 285.2, 292.1, 293, 241/294, 295
See application file for complete search history.

(56) References Cited

U.S. PATENT DOCUMENTS

| | | | |
|---|---|---|---|
| 1,396,108 A * | 11/1921 | Gilmore, Jr. ............... 241/294 |
| 2,150,278 A * | 3/1939 | Hegenbarth ................ 29/527.6 |
| 2,869,793 A * | 1/1959 | Montgomery ............... 241/295 |
| 4,377,259 A * | 3/1983 | Areaux et al. .............. 241/236 |
| 4,691,871 A | 9/1987 | Mochizuki |
| 5,485,771 A | 1/1996 | Brennan et al. |
| 5,670,290 A | 9/1997 | Manzolati |
| 6,129,851 A | 10/2000 | Nemedi et al. |
| 6,145,555 A * | 11/2000 | O'Neill ...................... 82/901 |
| 6,209,429 B1 | 4/2001 | Urso, III et al. |
| 6,340,125 B1 * | 1/2002 | Murata et al. ............ 241/292.1 |
| 6,405,877 B1 | 6/2002 | Nemedi et al. |
| 6,539,827 B2 * | 4/2003 | Yamaji et al. ................. 82/52 |
| 6,547,497 B2 * | 4/2003 | Lof et al. .................... 409/137 |
| 6,598,814 B2 * | 7/2003 | Bascom et al. ............. 241/293 |
| 6,694,849 B1 | 2/2004 | Binnie |
| 6,695,122 B2 * | 2/2004 | Enomoto .................... 409/137 |
| 6,907,657 B2 | 6/2005 | Wilbert et al. |
| 2004/0045146 A1* | 3/2004 | Studemann et al. ........ 29/27 C |

* cited by examiner

*Primary Examiner*—Dana Ross
(74) *Attorney, Agent, or Firm*—Fay Sharpe LLP

(57) ABSTRACT

An assembly suited to the lathing of cylindrical workpieces, such as photoreceptor blanks, includes a first drive system which rotates an associated workpiece about an axis of rotation. A machining tool machines a circumference of the workpiece to generate a strip of material. A cutting apparatus cuts the strip of material into sections. The cutting apparatus includes first and second rotatably mounted members which define a nip therebetween. A first of the rotatable members carries a cutting member on a peripheral surface thereof. A second drive system rotates the first and second rotatable members. The second drive system may be adjustable whereby a circumferential speed of the rotatable members can be matched to a circumferential speed of the workpiece. A transverse speed of the cutting apparatus may be matched to that of the machining tool.

13 Claims, 5 Drawing Sheets

SWARF CUTTER

BACKGROUND

The exemplary embodiment relates to a swarf cutter and to a method of cutting swarf. It finds particular application in conjunction with the machining of extruded raw tubes for forming photoreceptor drums and will be described with particular reference thereto. However, it is to be appreciated that the swarf cutter finds application in a variety of machining operations.

Photoreceptor drums for imaging devices, such as printers and copiers, are typically formed from tubes which are extruded from aluminum or similar metal. The extruded tubes or blanks generally have imperfect dimensions and are machined to meet the high tolerance requirements of precision devices. Machining may involve removal of material from the inside surface of the ends of the drum to facilitate precise positioning of end caps, cutting of the ends of the drums to achieve the desired drum length, and lathing the outside surface of the drum to ensure roundness, avoid conicity and form a mirror finish.

To produce a smooth finish suitable for use in an imaging device, the tube is typically subjected to a two-stage lathing operation. In the first stage, referred to as the precut, a relatively thick layer is removed from the surface of the tube with artificial diamond tooling. The tube is rotated while the tool bit is moved parallel with the axis of rotation. This generates a helical strip of material, often referred to as swarf, which may be approximately 0.2 mm in thickness and up to about 200-400 m in length, depending on the diameter and length of the tube. The swarf from the precut is difficult to handle because of its large volume and sharp edges. Additionally, if the swarf breaks while lathing, there is a tendency for defects to form in the workpiece, which are not readily removed in the second stage. Automated vacuum systems are generally unsuited to handling the weight of the swarf from the precut stage so the swarf is often collected in a bin at the back of the lathe and handled manually. This is a labor intensive operation and has to be performed carefully to avoid injuries from the rough cut swarf. In a second stage, referred to as the finish cut, a thin layer, about 0.02 mm in thickness, is removed from the machined tool using natural diamond tooling.

INCORPORATION BY REFERENCE

U.S. Pat. No. 4,691,871 to Mochizuki discloses a cutting apparatus which includes disk-like cutters fitted to first and second rotating cutter shafts.

BRIEF DESCRIPTION

In aspects of the exemplary embodiment, an assembly is provided which includes a first drive system which rotates an associated workpiece about an axis of rotation. A machining tool machines a circumference of the workpiece to generate a strip of material. A cutting apparatus cuts the strip of material. The cutting apparatus includes a first rotatably mounted member which defines a first peripheral surface, the first rotatable member carrying a cutting member on the first peripheral surface. A second rotatably mounted member defines a second peripheral surface, the first and second peripheral surfaces defining a nip therebetween. A second drive system rotates the first and second rotatable members.

In another aspect, a method includes rotating a workpiece about an axis of rotation, machining a circumference of the workpiece to generate a strip of material, passing the strip though a nip between first and second rotating rotatable members, cutting the strip with a cutting member, and controlling at least one of a rotation rate of at least one of the rotatable members and a transverse motion of the cutting member such that the strip reaches the nip unbroken In another aspect, a cutting apparatus includes first and second rotatable members which define a nip therebetween for receiving an associated strip of material therethrough. A drive system rotates the first and second rotatable members in opposite directions. The drive system is adjustable for matching a circumferential speed of the rotatable members to a speed at which the strip of material reaches the nip. At least one cutting member is carried by a first of the rotatable members for periodically cutting the strip of material as the cutting member enters the nip to form sections.

DETAILED DESCRIPTION

In aspects of the exemplary embodiment, swarf which has been generated from a workpiece by a machining apparatus is cut by a cutting apparatus, thereby rendering the swarf more manageable. A rotation speed of the cutting apparatus blade and/or the transverse motion of the cutting apparatus may be controlled to avoid breakage or buildup of the swarf upstream of the cutting apparatus. This minimizes the risk that the swarf may cause damage to the workpiece surface.

Figure 1:
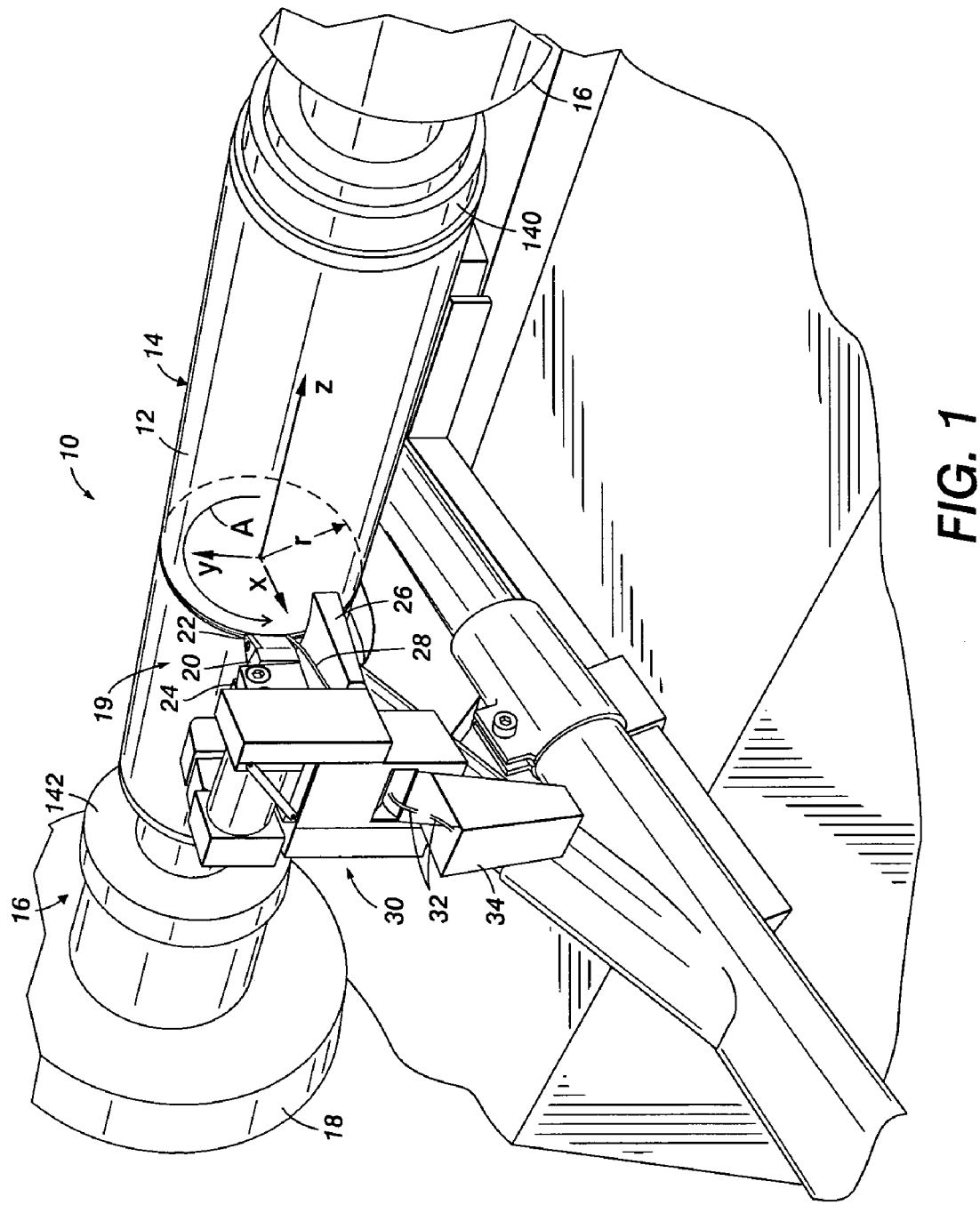
FIG. 1 is a perspective view of a machining system incorporating a swarf cutter according to one aspect of the exemplary embodiment.

With reference to FIG. 1, a portion of a machining apparatus 10, such as a lathe is illustrated. The lathe 10 is configured for machining a rotatably mounted workpiece 12, such as a hollow cylindrical tube or "blank" having a radius r and a peripheral outer surface 14 which defines the radius of the workpiece, in the form of a curvilinear plane. The lathe 10 includes a workpiece mounting apparatus 16 which supports the workpiece for rotation and a drive system 18, such as a servomotor, which rotates the workpiece in the direction of arrow A substantially about a longitudinal direction Z which corresponds substantially to the imaginary longitudinal axis Z-Z of the workpiece. For ease of reference, the X direction and Y direction referred to herein are perpendicular to the Z direction, as shown in FIG. 1.

A machining tool 19 may include a cutting head 20, which carries a tool bit 22 at its distal end, although other machining tools are also contemplated. The machining tool 19 is mounted for lathing the outer surface of the workpiece. In the illustrated embodiment, the cutting head 20 is clamped in a clamping member 24. The clamping member in turn is mounted to a support member 26, in the form of a curved bracket, which is translated in parallel with the axis of rotation Z-Z, by a suitable drive system (not shown). As a result, the tool bit 22 moves along the workpiece 12 during lathing in a direction which is generally parallel with the axis of rotation Z-Z. The tool bit 22 engages the outer surface 14 of the workpiece and progressively cuts away an outer layer of the workpiece as it traverses the length of the workpiece. The lathing generates a thin strip 28 of material or swarf, which may be about 0.02-0.4 mm in thickness, generally about 0.2 mm in thickness for the precut. The length of swarf generated from a workpiece 12 depends on the length of the workpiece to be lathed and the diameter of the workpiece. In general, the swarf may have an uncut length of at least 10 meters and in one embodiment, at least 100 meters. The swarf moves away from the cutting tool at a fixed speed, which is a function of the diameter of the workpiece and its rotation speed.

The swarf 28 that is generated during lathing is guided to a cutting apparatus or swarf cutter 30, which in the illustrated embodiment, is carried by the support member 26, so that the swarf cutter moves in tandem with the tool bit 20. Sections 32 of swarf cut by the swarf cutter 30 may be collected in a bin 34, positioned adjacent the swarf cutter. Alternatively, the swarf pieces 32 may be drawn into a vacuum system (not shown). The swarf cutter 30 is close to the tool bit 20, in the illustrated embodiment, less than about 100 cm from the tool bit, e.g., about 60 cm or less, to minimize the risk of breakage of the swarf intermediate the tool bit 22 and the swarf cutter 30.

Figure 2:
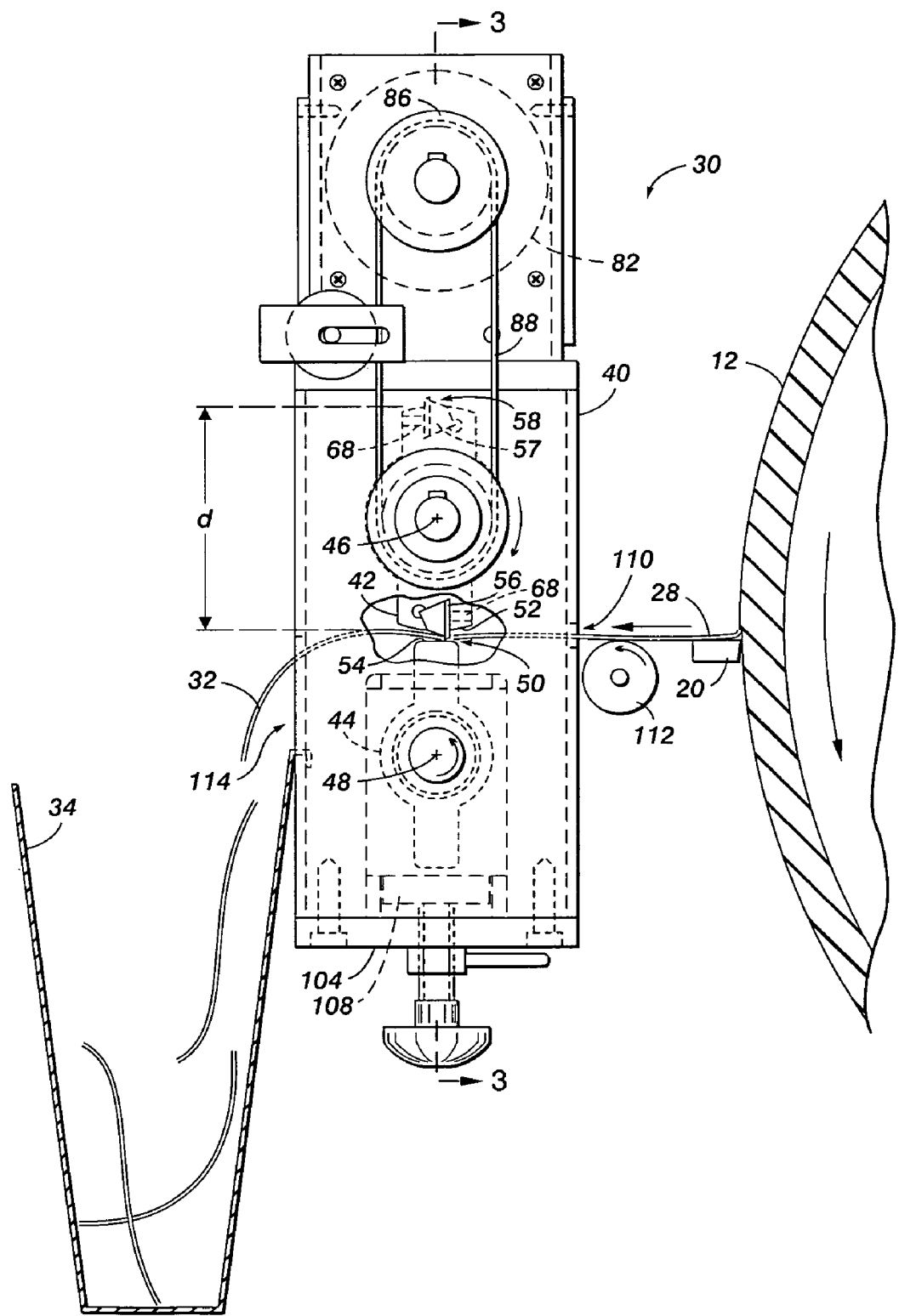
FIG. 2 is a side view, partially cut away, of a first embodiment of the swarf cutter of FIG. 1.
Figure 3:
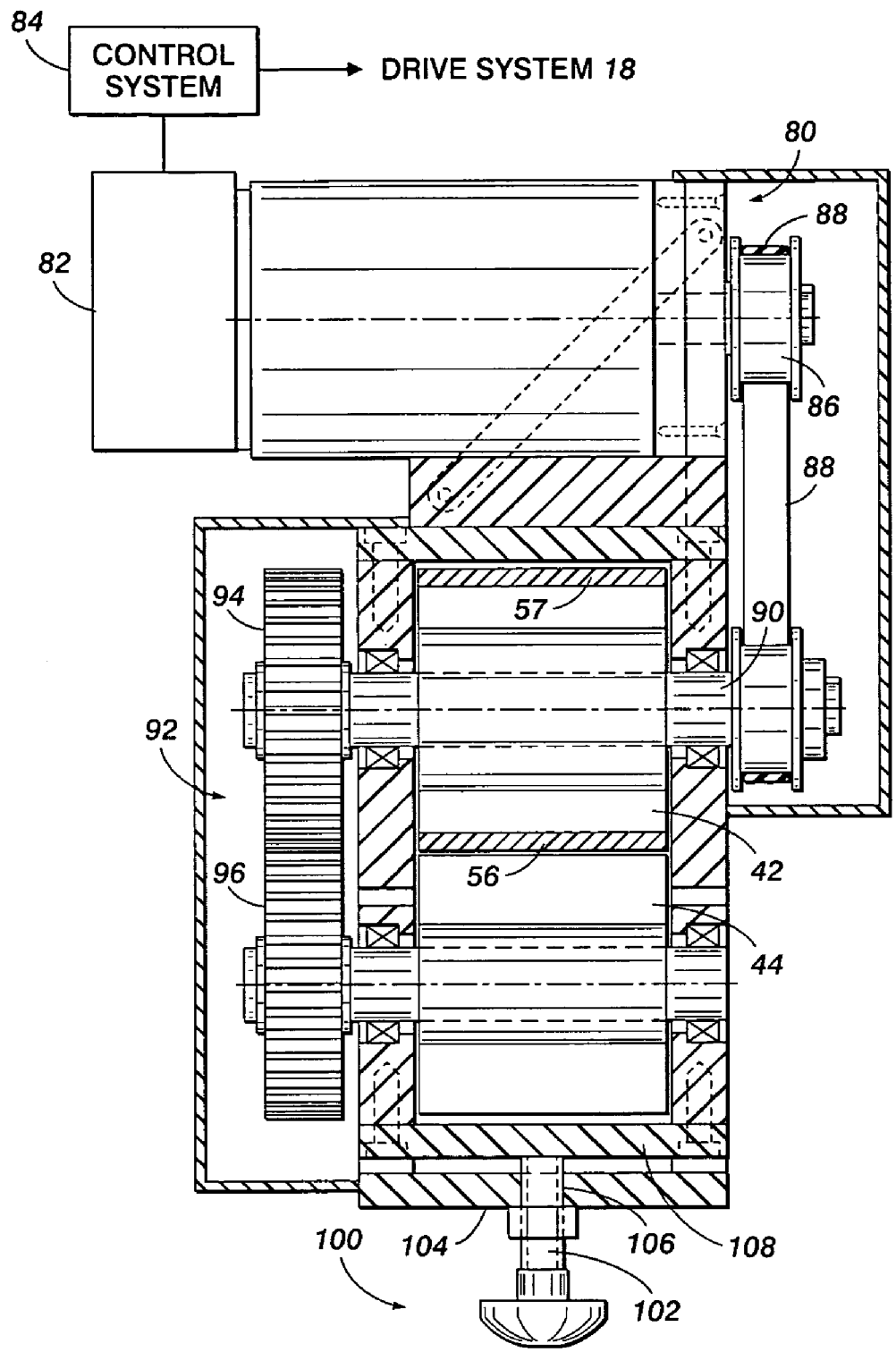
FIG. 3 is a side sectional view through A-A of FIG. 2.

With reference now to FIGS. 2 and 3, which show an exemplary swarf cutter 30, the swarf cutter includes a housing 40. Two rotatable members 42, 44 of substantially equal maximum diameter d are mounted in the housing 40 for rotation about respective axes 46, 48, which may be generally aligned with the axis of rotation of the workpiece 12. The rotatable members are rotated in opposite directions to draw the uncut swarf 28 through a nip 50 formed between peripheral surfaces 52, 54 of the two members 42, 44. A first of the rotatable members 42 carries at least one cutting member 56, 57, such as a knife blade, which may be formed from hardened steel or other suitable material for cutting the swarf. Each cutting member 56 extends radially outwardly from the peripheral surface 52 to define a cutting edge 58 which extends generally parallel with the axis of rotation 46 of the rotatable member 42. The cutting edge 58 may extend about 0.4-1.5 mm from the surface 52. The extension of the cutting edge 58 beyond the surface 52 may be approximately equal to the width of the swarf. Periodically, as the rotatable member 42 rotates, the cutting edge 58 is brought into contact with the swarf 28 being drawn through the nip 50 and cuts a section 32 of swarf which falls into the bin 34. The remaining swarf 28 upstream of the nip remains intact and continues to travel through the nip region. The sections 32 of swarf may have a length (longest dimension) of about 1 meter or less, for example, about 13 cm (for a cylinder 42 of diameter about 82 mm).

Figure 4:
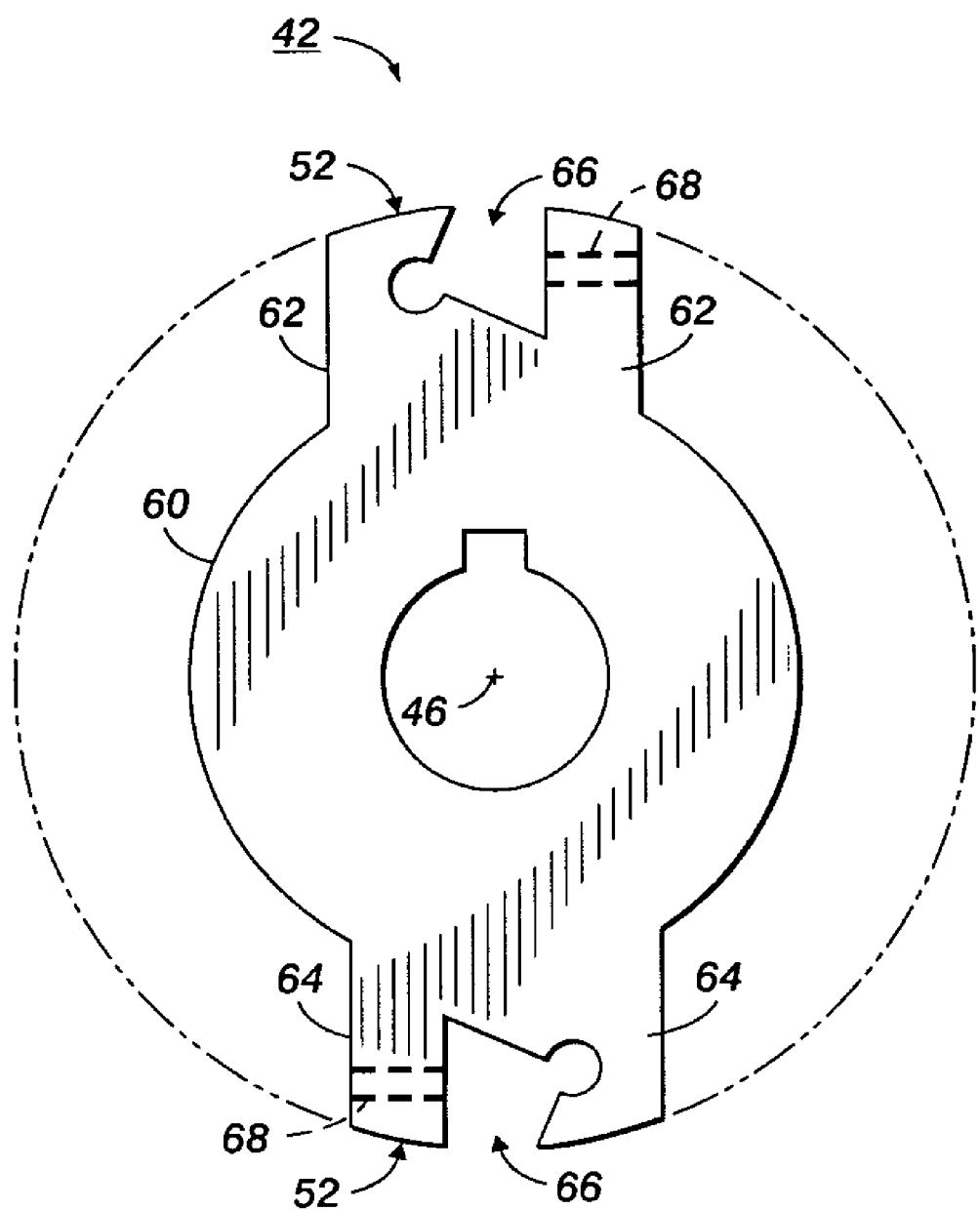
FIG. 4 is an enlarged side sectional view of an upper rotatable member of the swarf cutter of FIG. 2.

As shown in FIG. 4, in which the knife blades has been removed, the first (upper) rotatable member 42 includes a generally cylindrical radially inner portion 60 and two projecting portions 62, 64 (one for each knife) with an outer surface 52 which defines the diameter of the rotatable member. The projecting portions 62, 64 extend radially outward from the axis of rotation 46 of the first rotatable member. The surface 52 may define an arc of an imaginary circle having a center at the axis of rotation 46. Each surface 52 defines a slot 66, which receives the knife blade. Each knife blade 56 is held in position by a suitable fixing member, such as a set screw 68 (FIG. 2). In the exemplary embodiment, two knife blades 56, 57 are employed, which are equally spaced at 180 degrees. However, it is contemplated that there may be fewer or more than two knife blades. Each knife blade 56 may be equally spaced around rotatable member 42, i.e., around the circumference of the imaginary circle of which the surfaces 52 form a part. The rotatable member 44 may be similarly shaped to member 42, i.e., with first and second equally spaced projecting portions 70, 72. However, the projecting portions 70, 72 lack a cutting member. In the illustrated embodiment, each pair of projecting portions 64, 70 (and 62, 72) is aligned once each revolution to define the nip therebetween (i.e., two nips are created in the illustrated embodiment per revolution). The projecting portion 70 (or 72) on the second rotatable member 44 which is on the opposite side of the nip to the knife 56 that is cutting the swarf defines a generally smooth arcuate surface 54, which is free of cutting blades, to provide an even pressure on the underside of the swarf 28 passing through the nip 50.

In an alternative embodiment the members 42, 44 each include a cutting member. The cutting members in this embodiment are offset such that when entering the nip, one of the opposed surfaces 52, 54 which defines the nip is free of a cutting member, while the other one has a cutting member. Thus, there is no more than one cutting member in the nip at any time.

The rotatable members 42, 44 may be formed from a conformable material, such as aluminum or plastic, which grips the swarf in the nip 50.

As illustrated in FIG. 3, the rotatable members 42, 44 are driven by a second drive system 80 which may comprise a drive motor 82, such as a servomotor. In one embodiment, the servomotor is maintained at a rotational speed which is calibrated to a rotation speed of the drive system 18. The servomotor 82 has a variable speed which may be accurately adjusted and maintained. Specifically, the circumferential speed of the rotatable members 42, 44 in the nip is matched to a circumferential speed of the workpiece (i.e., the rate at which the swarf is generated) so that the swarf 18 remains intact between the tool bit 22 and the cutting blade 56—i.e., is neither over-tensioned nor under-tensioned. As a result, damage to the workpiece which may result from breakage of the swarf is avoided. The circumferential speed S of the workpiece 12 may be determined from its rotation rate T (e.g., in rpm) by servomotor 18 and the diameter D of the workpiece (S=2πTD). Then, for a diameter d of the rotatable members 42, 44, their rotation rate t by servomotor 82 in rpm may be set to about TD/d to maintain the same circumferential speed S. Typically, the workpieces to be lathed will have the same approximate outer diameter D, at least for a given batch to be lathed. Thus D/d may be considered to be a constant. Of course some accommodation may need to be made for the fact that the swarf, being thin, may not correspond exactly to the length of the outer circumference from which it is derived, and the fact that the rotation of the motor 82 may not be directly transferred to the rotatable members 42, 44. In one embodiment, adjustments may be made by eye, for example, by viewing the swarf to make sure it is not overly tensioned or drooping and making adjustments to the servomotor 82 rotation rate. In general, the servomotor may have a rotation speed of about 4000 to 6500 RPM, e.g., about 5000 RPM.

In one embodiment, a control system 84 registers the rotation rate T of the workpiece 12 from servomotor 18 and adjusts the rotation rate of the rotatable members 42, 44 by servomotor 82 accordingly. Other methods may be used to determine an appropriate rotation rate of the servomotor 82, for example, by measuring the speed at which the swarf 28 moves using a suitable sensor (not shown) positioned intermediate the tool bit and the nip.

In the illustrated embodiment, both rotatable members 42, 44 are operatively coupled to the same servomotor 82 and driven at the same circumferential speed by the servomotor 82. It is also contemplated that the drive system may comprise separate servomotors, one for each rotatable member, which maintain the same circumferential speed for each rotatable member 42, 44. The servomotor 82 may be coupled to one of the rotatable members, e.g., the upper rotatable member 42, by a drive shaft 86 and drive belt 88, as shown in FIG. 3. The drive belt 88 is mounted on the drive shaft 86 and on an axial shaft 90 of the first rotatable member 42 to transfer rotational motion thereto. To provide the lower rotatable member 44 with rotation in the opposite direction, a gear system 92 comprising gears 94, 96 operatively connects the first and second rotatable members.

In other embodiments, the second drive system is a slave of the first drive system, for example, a drive belt or gears operatively connect the servomotor of the first drive system with the first and second rotatable members.

An adjustment device 100 provides for adjustment of a width of the nip 50. For example the adjustment device includes an adjustment member 102, such as a screw, which is received through a lower wall 104 of the housing. The adjustment member has a threaded portion which is received in a threaded bore 106 defined by a support member 108 for the axial shaft of the second rotatable member 44. The adjustment member 102 is rotated to raise or lower the support member 108. In this way, the width of the nip 50 can be adjusted to accommodate different widths of swarf.

The incoming swarf may be guided into the housing 40 by an inlet slot 110. Alternatively or additionally, a guide member 112, such as a rotatable cylinder supports the swarf between the tool bit 20 and the housing 40. An outlet slot 114 allows the cut swarf 32 to exit the housing.

Figure 5:
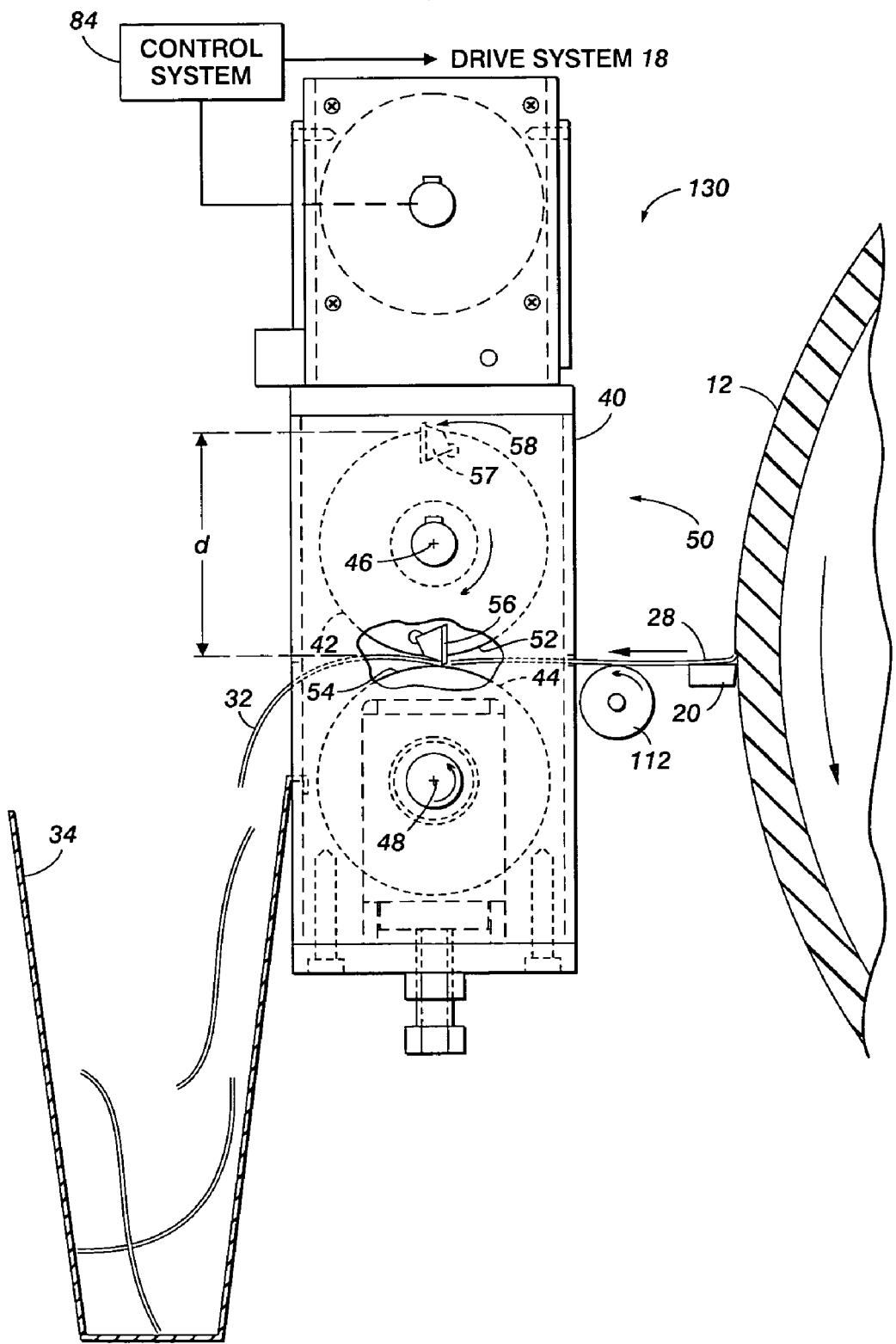
FIG. 5 is a side sectional view of a second embodiment of the swarf cutter of FIG. 1.

With reference now to FIG. 5, another embodiment of a swarf cutter 130 is shown which may be similarly configured to swarf cutter 30, except as noted. Similar elements are accorded the same numerals and new elements are accorded new numerals. The swarf cutter includes two rotatable members 42, 44 of substantially equal diameter which are mounted in the housing 40 for rotation about respective axes 46, 48, which may be generally aligned with the axis of rotation of the workpiece 12. In this embodiment, there are no projecting portions 62, 64, 70, 72. Rather, the surfaces 52, 54 are circular or substantially circular in cross section. The cylindrical members 42, 44 are rotated in opposite directions to draw the uncut swarf 28 through a nip 50 formed between peripheral surfaces 52, 54 of the two members 42, 44. As with the embodiment of FIGS. 2-4, a first of the cylindrical members 42 carries at least one cutting member 56, 57 such as a knife blade. Each cutting member 56 extends radially outwardly from the peripheral surface 52 to define a cutting edge 58 which extends generally parallel with the axis of rotation 46 of the cylindrical member 42. The extension of the cutting edge 58 beyond the surface 52 may be approximately equal to the width of the swarf.

The cylindrical members are driven by a drive system, analogous to the drive system 80 of FIGS. 2 and 3. In the embodiment of FIG. 5, it is less important that the rotation speed of member 42 matches the speed of member 44 exactly, as the surface of member 44 is cylindrical. However, with some swarf thicknesses, the embodiment of FIGS. 2-4 is less prone to occasional blockage of the swarf upstream of the nip.

In other embodiments, the first rotatable member 42 may be configured as shown in FIG. 2, while the second rotatable member 44 is configured as shown in FIG. 5, or vice versa.

In one embodiment, the workpiece 12 comprises a hollow cylinder of metal, such as a high purity aluminum, e.g., from about 95% to 100% pure aluminum, to be used as a photoreceptor drum and the lathing with the tool bit 22 increases its outer surface smoothness and/or uniformity of its outer diameter. The swarf 28 is thus formed of the same material as the workpiece.

Lathes suitable for mounting a cylindrical workpiece are known and described, for example, in U.S. Pat. Nos. 6,907,657 and 6,209,429, the disclosures of which are incorporated herein in their entireties by reference. The mounting apparatus 16 typically includes cylindrical supporting fixtures 140, 142 for inserting into opposite ends of the hollow workpiece 12 for transferring rotational motion to the workpiece. The drive system 18 rotates the supporting fixture 142 at a predetermined speed.

A method of machining a workpiece using the exemplary swarf cutter 30, 130 includes extruding a workpiece, such as an aluminum-containing tube, mounting the workpiece on a lathe for rotation, and mounting a tool bit adjacent a surface of the workpiece. The tool bit is translated parallel with the longitudinal axis of the rotating workpiece, whereby a continuous strip of material (swarf) is lathed from the workpiece having an uncut length which is a plurality of times the circumference of the workpiece. For example, the aluminum blank may be mounted horizontally on the lathe and turned at a rotation speed of about 4000 rpm. The precut swarf is drawn through a pair of rotating members which define a nip therebetween. The strip is cut with a cutting device associated with a first of the rotating members, which periodically enters the nip. A rotation rate of at least one of the rotating members is controlled such that the circumferential speed of the rotating member in the nip matches a circumferential speed of the workpiece. The method further includes cutting the swarf into lengths with the cutting device.

In the exemplary embodiment, the blank may be cut in two stages, a precut and a finish cut. The swarf cutter 30, 130 may be utilized for both the precut and the finish cut or may be used in only one of the stages, such as the precut.

The precut may be made with the tool bit moving at a traverse speed of about 720 mm/min. The final cut, where used, may be made using a traverse speed of about 900 mm/min.

To form electrophotographic imaging members, the machined workpiece 12 may be coated with one or more organic layers, such as a blocking layer, a charge generating layer, and a charge transport layer. Alternatively, a single photoconductive layer may be applied to the workpiece. Thus, for the manufacture of electrophotographic imaging members, at least one photoconductive coating is applied to the workpiece.

In addition to use on newly extruded tubes, the exemplary method may be used on reclaimed tubes, such as used photoreceptor drums as described, for example, in U.S. Pat. No. 5,670,290, the disclosure of which is incorporated herein by reference in its entity. In this process, the imaging layer(s) are removed and material removed from the aluminum substrate to a radial distance of between about 10 micrometers and about 400 micrometers to improve the smoothness.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An assembly comprising:
   a first drive system which rotates an associated workpiece about an axis of rotation;
   a machining tool which machines a circumference of the workpiece to generate a strip of material; and
   a cutting apparatus which is positioned to receive the strip unbroken from the workpiece and which cuts the strip of material, the cutting apparatus comprising:
      a first rotatably mounted member which defines a first peripheral surface, the first rotatable member carrying a cutting member on the first peripheral surface;
      a second rotatably mounted member which defines a second peripheral surface, the first and second peripheral surfaces defining a nip therebetween; and
      a second drive system which rotates the first and second rotatable members.

2. The assembly of claim 1, wherein the second drive system drives both rotatable members.

3. The assembly of claim 1, wherein the cutting member comprises at least two cutting members.

4. The assembly of claim 3, wherein the at least two cutting members are arcuately spaced around a periphery of the first rotatable member.

5. The assembly of claim 1, wherein the cutting member includes a cutting edge which extends generally parallel with an axis of rotation of the first rotatable member.

6. The assembly of claim 1, wherein the first rotatable member defines a slot in a circumference thereof which receives the cutting member therein such that a cutting member protrudes radially outwardly from the circumference.

7. The assembly of claim 1, further comprising a control system which adjusts a rotation speed of the second drive system as a function of a rotation speed of the associated workpiece.

8. The assembly of claim 1, wherein at least one of the first and second rotatable members defines at least one projecting portion which defines the peripheral surface.

9. The assembly of claim 8, wherein the first rotatable member defines at least two projecting portions, each projecting portion carrying a cutting member.

10. The assembly of claim 1, wherein the first rotatable member defines a plurality of projecting portions which extend radially outward from an axis of rotation of the first rotatable member, at least one of the projections carrying the cutting member.

11. The assembly of claim 1, wherein the peripheral surface of at least one of the first and second rotatable members is cylindrical.

12. An assembly comprising:
   a first drive system which rotates an associated workpiece about an axis of rotation;
   a machining tool which machines a circumference of the workpiece to generate a strip of material, the machining tool being mounted for transverse motion relative to the workpiece; and
   a cutting apparatus which cuts the strip of material, the cutting apparatus being mounted for transverse motion in tandem with the machining tool, the cutting apparatus comprising:
      a first rotatably mounted member which defines a first peripheral surface, the first rotatable member carrying a cutting member on the first peripheral surface;
      a second rotatably mounted member which defines a second peripheral surface, the first and second peripheral surfaces defining a nip therebetween; and
      a second drive system which rotates the first and second rotatable members.

13. A method comprising:
   providing the assembly of claim 1;
   rotating an associated workpiece about an axis of rotation with the first drive system;
   machining a circumference of the workpiece to generate a strip of material with the machining tool;
   receiving the strip unbroken from the workpiece at the nip; and
   cutting the strip of material with the cutting apparatus.

* * * * *